United States Patent
Connerty et al.

(10) Patent No.: US 10,328,800 B2
(45) Date of Patent: Jun. 25, 2019

(54) VEHICLE INTERLOCK WITH LOCATION DETECTION

(75) Inventors: Denise L. Connerty, Toronto (CA); Felix J. E. Comeau, Toronto (CA)

(73) Assignee: Alcohol Countermeasure Systems (International) Inc., Toronto, Ontario (CA)

( * ) Notice: Subject to any disclaimer, the term of this patent is extended or adjusted under 35 U.S.C. 154(b) by 453 days.

(21) Appl. No.: 13/526,202

(22) Filed: Jun. 18, 2012

(65) Prior Publication Data

US 2013/0338880 A1 Dec. 19, 2013

(51) Int. Cl.
B60K 28/06 (2006.01)

(52) U.S. Cl.
CPC ......... B60K 28/06 (2013.01); *B60W 2540/24* (2013.01)

(58) Field of Classification Search
CPC combination set(s) only.
See application file for complete search history.

(56) References Cited

U.S. PATENT DOCUMENTS

| | | | |
|---|---|---|---|
| 6,697,732 B1* | 2/2004 | Gotfried | 701/516 |
| 2010/0108425 A1* | 5/2010 | Crespo et al. | 180/272 |
| 2010/0251804 A1* | 10/2010 | Morley | B60K 28/063 73/23.3 |
| 2012/0055726 A1* | 3/2012 | Hannon | H04K 3/415 180/272 |
| 2012/0228047 A1* | 9/2012 | White | B60K 28/063 180/272 |
| 2012/0236136 A1* | 9/2012 | Boddy | 348/78 |
| 2013/0066223 A1* | 3/2013 | Beck et al. | 600/532 |

* cited by examiner

*Primary Examiner* — Hussein Elchanti
*Assistant Examiner* — Paul A Castro
(74) *Attorney, Agent, or Firm* — Head, Johnson, Kachigian & Wilkinson, PC

(57) ABSTRACT

A system for use with a motor vehicle, the system including a gas sampler device including a wireless communication subsystem and an input element configured to receive a gas sample. The system further includes an interlock device including a second wireless communication subsystem and a computing device configured to: determine a location of the gas sampler device within the motor vehicle based on proximity of the wireless communication subsystem, and activate an alarm event in dependence of the location of the gas sampler device within the motor vehicle.

9 Claims, 4 Drawing Sheets

VEHICLE INTERLOCK WITH LOCATION DETECTION

BACKGROUND OF THE INVENTION

1. Field of the Invention

The invention relates to the field of automotive interlocks.

2. Prior Art

It is known to secure a motor vehicle against operation by a person who has consumed alcohol. A typical arrangement, known as an breath alcohol ignition interlock device (BAIID), involves a relay between the breath tester and the starter motor, pursuant to which the starter motor cannot be engaged until a satisfactory breath sample has been given. In this regard, a 'satisfactory' gas sample is conventionally understood to be one that (i) is of sufficient volume and pressure to permit alcohol analysis; (ii) has alcohol concentration below a predetermined limit; and (iii) appears to have originated from the exhaled breath of a human being. Criterion (iii) is often assessed through measurements of pressure, humidity and temperature, but various other techniques such as hum recognition sensors are occasionally used. In some jurisdictions, a person convicted of driving under the influence of alcohol may be required by law to have a device of this type installed as a condition associated with the extension of driving privileges. While the engine is running, the BAIID may randomly require the driver to provide another breath sample. The time between required breath samples is dependent on the setting of the unit but, for example, it is typical for random breath samples to be required every 10 to 20 minutes while the vehicle is in operation. All events are logged, for the purpose of, inter alia, compliance purposes. It is known for persons to attempt to circumvent a BAIID device by having a "sober" friend blow into the device to start or maintain operation of the vehicle.

Other difficulties with existing systems may be appreciated in view of the description below.

SUMMARY OF THE INVENTION

According to one aspect of the invention, there can be provided a system for use with a motor vehicle, the system including a gas sampler device including a wireless communication subsystem and an input element configured to receive a gas sample. The system further includes an interlock device including a second wireless communication subsystem and a computing device configured to: determine a location of the gas sampler device within the motor vehicle based on proximity of the wireless communication subsystem, and activate an alarm event depending upon the location of the gas sampler device within the motor vehicle.

According to another aspect of the invention, there can be provided a method performed by a computing device for use with a motor vehicle, the method including the steps of: determining a location of a gas sampler device within the motor vehicle based on proximity of a wireless communication subsystem of the gas sampler device, and activating an alarm event depending upon the location of the gas sampler device within the motor vehicle.

According to yet another aspect of the invention, there can be provided a non-transitory computer readable medium having instructions stored thereon executable by a processor for use with a motor vehicle, including instructions for performing the method.

According to another aspect of the invention, there can be provided an improved interlock device for use with a vehicle and by a driver of the vehicle. The vehicle can be of the type having a seat occupied in use by the driver of the vehicle. The interlock device can be of the type having a handpiece including a gas sampler device. In this aspect of the invention, the improvement comprises a wireless communication subsystem and a computing device configured to determine a location of the gas sampler device.

According to another aspect of the invention, the improved interlock device can trigger an alarm event in the event that a breath sample is delivered to the handpiece when the determined location of the gas sampler device is outside a predetermined zone associated with the seat.

According to another aspect of the invention, the predetermined zone can be defined by the physical space wherein the handpiece could be situated during the delivery of a breath sample to the handpiece by the driver, when the driver is occupying the seat and positioned to drive the vehicle.

According to another aspect of the invention, the improved interlock device can further include an image capture device and the predetermined zone is defined by the physical space wherein the handpiece could be situated during the delivery of a breath sample to the handpiece by the driver, when the driver is positioned in a manner which would permit the image capture device to capture an image of the face of the driver sufficient to allow identification of the driver. Other advantages, features and characteristics of the systems and methods, will become more apparent upon consideration of the following detailed description and the appended claims.

BRIEF DESCRIPTION OF THE DRAWINGS

Embodiments will now be described, by way of example only, with reference to the attached Figures, wherein.

DETAILED DESCRIPTION OF THE PREFERRED EMBODIMENT

Exemplary embodiments of the invention generally involve determining a location of a gas sampler device within a motor vehicle, such as within a driver seating area, and activating a vehicle interlock system based on the location of the gas sampler device.

Figure 1:
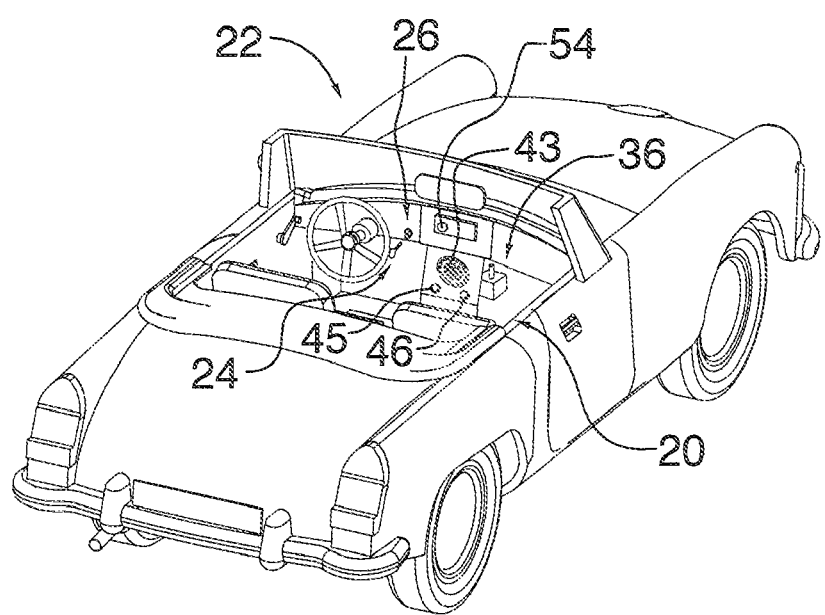
FIG. 1 illustrates a view of an interlock according to an exemplary embodiment of the invention in use with a vehicle.
Figure 2:
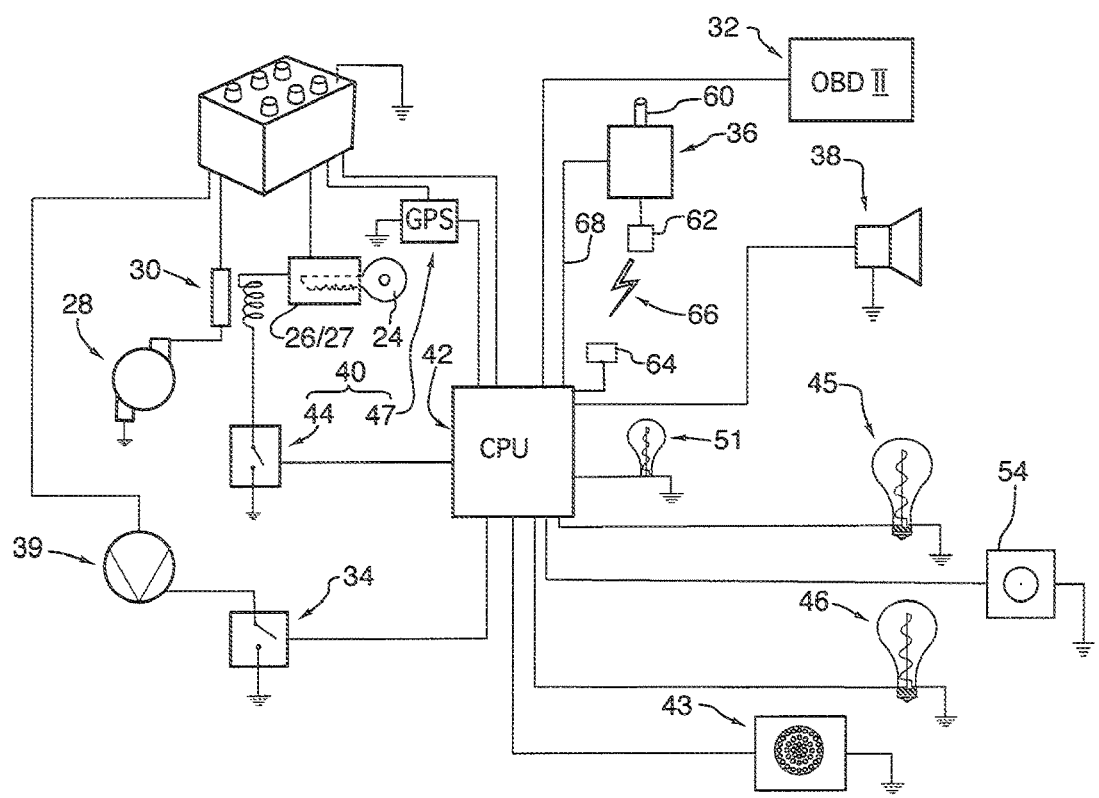
FIG. 2 illustrates a schematic view of the interlock of FIG. 1 in combination with germane systems of the vehicle.

An interlock device 20 or system according to an exemplary embodiment of the invention is hereinafter described with reference to FIG. 1 and FIG. 2 but, as an initial matter, it will be understood that the exemplary interlock device 20 is for use with a motor vehicle 22.

This motor vehicle 22 is of a conventional type which is user-selectable between an operable state in which the vehicle is capable of being put into motion by its motor and an inoperable state in which the vehicle is incapable of being put into motion by its motor. The user-selection is accommodated by way of a mechanical key 24 that the user inserts in a tumbler 26 arrangement; a partial turn activates the ignition circuit 27 and a full turn activates the starter motor 28 of the vehicle, through actuation of a starter solenoid 30. The nil-turn position corresponds to the inoperable state;

both partial and full-turn positions correspond to the operable state. The vehicle 22 may also be of the type including an OBD-II compliant On-Board Diagnostics System 32 that generates signals including vehicle speed and vehicular operational state and is also of the type having an immobilizer circuit 34 for interfering with motion of the vehicle, for example, a switch in the circuit powering the fuel pump 39.

Turning now to the exemplary interlock device 20, the interlock device 20 may include a gas sampler device 36, a siren 38, a controller 40, a tone generator 43, a prompt light 45, a warning light 46, a fail light 51, and a camera 54.

The gas sampler device 36 may be of the fuel cell sensor type adapted to receive and analyze a gas sample and produce a signal that varies in a predictable manner with alcohol concentration in the gas sample. The gas sampler device 36 includes an input element 60 which may be cylindrical shaped configured to receive a gas sample from the user. The gas sampler device 36 is also of the type adapted to test the gas sample for pressure, temperature, flow, humidity and volume. On completion of an analysis, the gas sampler device 36 produces signals which are indicative of the analyses. The gas sampler device 36 includes a wireless communications subsystem 62 for sending and/or receiving wireless signals.

The siren 38 is mounted in use in the engine compartment.

The controller 40 includes a computing device 42, a relay 44 and a Global Positioning System (GPS) device 47.

The relay 44, in use, is interposed in the circuit powering the starter solenoid 30.

The camera 54 may include a still image camera or a video image camera, which can include video and audio recording. The camera 54 may be positioned within the motor vehicle 22 to be generally directed at the driver, for example at least to view the breath input action.

The computing device 42 includes a memory or computer readable medium which stores instructions executable by a processor or controller. Computing device 42: is for receiving the signals produced by and actuating the gas sampler device 36; is coupled to the relay 44, for actuation thereof; in use, is coupled to and receives signals from OBD-II circuit; in use, is coupled to the immobilizer circuit 34; and is coupled to the GPS device 47.

A wireless communication subsystem 64 is operable by the computer device 42 to send and/or receive signals with the wireless communication subsystem 62 of the gas sampler device 36 over a wireless communications medium 66. In accordance with some exemplary embodiments of the invention, the wireless communications medium 66 may be used to determine a location of the gas sampler device 36 within the motor vehicle 22.

In some exemplary embodiments, some or all of the control and analysis communications may be exchanged (sent or received or both) over the wireless communications medium 66. In some other example embodiments, a wired connection 68 may be used to exchange at least some of the control and analysis communications.

In some exemplary embodiments, the wired connection 68 may also be used as a power source to power the gas sampler device 36. In other exemplary embodiments, not shown, a charging station may be used to charge a portable power source such as a battery of the gas sampler device 36.

The computing device 42 may include the following functions: prompt generation; gas sampler actuation; gas sampler location detection; analysis; enablement/disablement; and alarm.

Prompt Generation

While the vehicle 22 is in an operable state (i.e. in the described embodiment, this being when the ignition switch is either in the partially-turned or fully-turned position) the computing device 42 periodically generates a prompt, which is audibly and visually signaled to the operator of the vehicle through actuation of the tone generator 43 and prompt light 45.

The period between prompts is a random or pseudo-random period that depends on the number of prompts that have occurred since the vehicle last entered an operable state; the random period preceding each prompt is relatively short in comparison to the random period between that prompt and the next prompt.

The random period is obtained through a random number generator and a timer which form part of the computing device 42. The tone generator 43 and prompt light 45 may be adapted to vary in intensity as a function of the location of the vehicle (e.g. as determined by the GPS device 47) and the time elapsed and distance driven since the issuance of the prompt.

Gas Sampler Actuation

The gas sampler device 36 can be actuated manually, when the vehicle 22 is disabled or in the inoperable state.

When the vehicle 22 is in the operable state, a prompt may be issued to the user at periodic, random or pseudo-random times. When a prompt is issued, the computing device 42 actuates the gas sampler device 36 for receiving and analyzing any gas sample introduced thereinto (and producing signals indicative of the analyses as aforesaid).

In some example embodiments, when the gas sample is received by the gas sampler device 36, the camera 54 may be used to capture a simultaneous image or video of the user who is providing the gas sample. The images or video may be logged.

Gas Sampler Location Detection

Figure 3:
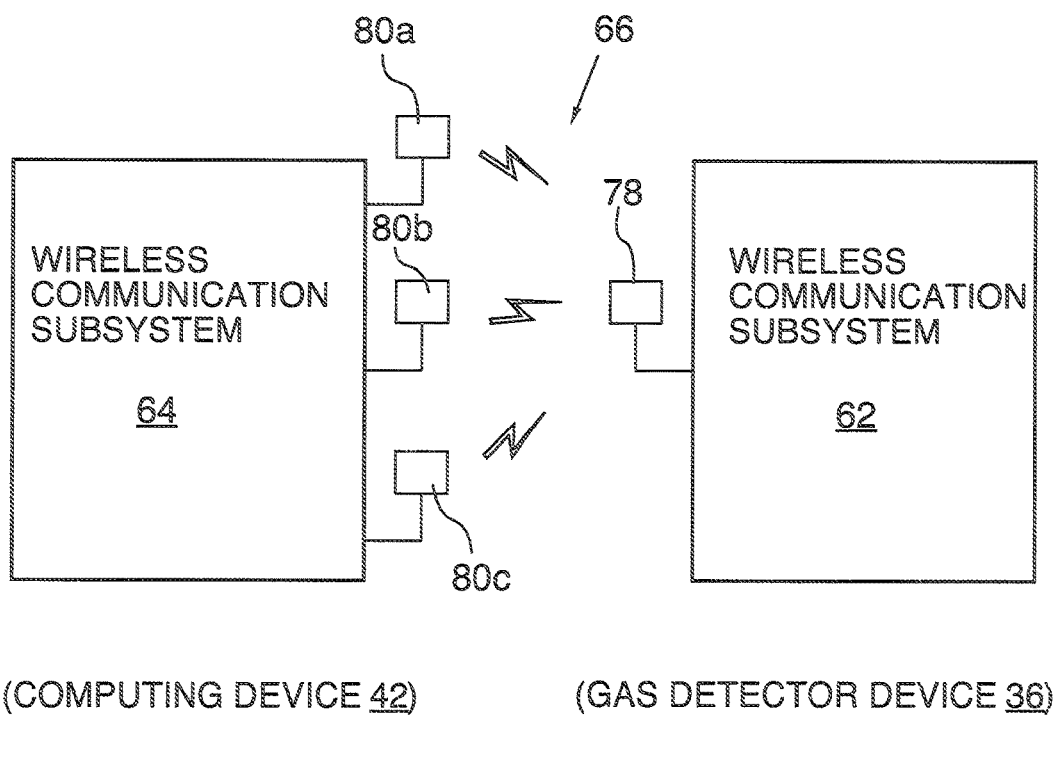
FIG. 3 illustrates a detail schematic view of a location detection feature of the interlock of FIG. 1.

Referring to FIG. 3, a location detection feature of the gas sampler device 36 will now be described which is used to determine the relative location of the gas sampler device 36 within the vehicle 22. For example, if the gas sampler device 36 is moved out of a specified location when receiving the gas sample, an alarm event may be triggered.

As shown in FIG. 3, the wireless communication subsystem 62 of the gas sampler device 36 communicates with the wireless communication subsystem 64 of the computing device 42 over the wireless communications medium 66.

The gas sampler device 36 may include one or more antenna elements 78 (one shown) or wireless modules which may be embedded or internal to the gas sampler device 36. The antenna element 78 may be formed of at least some conductive material for receiving or transmitting (or both) of electromagnetic signals. In some example embodiments, the wireless communication subsystem 62 may further include receivers, transmitters, associated components, local oscillators (LOs), and/or processing modules such as a digital signal processor (DSP).

Similarly, the wireless communication subsystem 64 of the computing device 42 may include one or more antenna elements 80a, 80b, . . . , 80n (each or collectively referred to as 80) or wireless modules. In some exemplary embodiments, the antenna elements 80 may comprise part of separate or external receiver/transmitter (as appropriate) modules which are located or installed into desired parts within the car. The antenna elements 80 may be formed of at least some conductive material for receiving or transmitting (or both) of electromagnetic signals. The wireless communication subsystem 64 may further include receivers, transmitters, associated components, local oscillators (LOs), and/or processing modules such as a digital signal processor (DSP).

The antenna elements 80 of the computing device 42 may be positioned within specified locations within the vehicle 22 so as to determine the location of the antenna element 78, and therefore the location of the gas sampler device 36. For example, a specified area where the gas sampler device 36 must be located when receiving the gas sample may be, e.g., the driver seating area within vehicle 22.

For example, a time-of-flight of a signal which travels between the antenna elements 78, 80 may be calculated to determine the location of the antenna element 78. A one-way time-of-flight or a round-trip time-of-flight may be used for the calculation, depending on the particular system configuration.

For example, in some example embodiments only one antenna element 80 may be coupled to the computer device 42. As the single antenna element 80 results in a point source of detection, a "sphere" of location detection would be determined in such embodiments. The location of the other antenna element 78 may be determined from a scouting signal sent from the antenna element 80 to the antenna element 78, and a responsive signal may be sent by the antenna element 78 in response. The total or one-way time of flight may be used to determine the location of the other antenna element 78, or at least whether the antenna element 78 is located within a specified "sphere" of location detection.

Other time of flights, synchronization schemes, or initial trigger communications may be implemented using control signals over, for example, the wireless communications medium 66 and/or the wired connection 68, as would be understood in the art.

Some suitable positions for mounting the antenna element 80 within the vehicle 22 would be e.g. the driver side dashboard, the steering wheel, etc. Some acceptable defined regions for the location of the gas sampler device 36 may include, for example, a specified quadrant of the vehicle 22, a specified half of the vehicle 22 (e.g. front region), a specified region visible by the camera 54, etc. in some exemplary embodiments, the location of the antenna element 80 may move. For example, the antenna element 80 may be mounted within the driver seat, which may periodically move or adjust when the driver seat is adjusted but could still be used to define an acceptable position of the gas sampler device 36 within the vehicle 22.

In some example embodiments, two antenna elements 80 may be coupled to the computer device 42. The two antenna elements 80 would generally be spaced apart within the vehicle 22, for example at opposite ends, etc. This provides for greater accuracy of position detection of the gas sampler device 36 within the vehicle 22 than with one antenna element 80.

In some exemplary embodiments, three or more antenna elements 80 may be coupled to the computing device 42. For example, three antenna elements 80 could generally be spaced apart within the vehicle 22. In some exemplary embodiments, for example, a scouting signal or initial trigger communication would not be required as the received signals can be used to triangulate the position of the gas sampler device 36 within the vehicle 22. Various triangulation methods may be used as would be understood in the art, for example may be performed by determining the differential time receipt of the received signal, etc. Such methods can be used to more specifically define acceptable locations or even irregular-shaped acceptable specified locations for the gas sampler device 36.

When using the signals to determine location, in some of the described exemplary embodiments the communication subsystem 62 has active or passive response to received signals, which only react once a signal is received, similar to some transponder technologies. This can save resources from having the communication subsystem 62 continuously transmit its signal for location detection.

Although various exemplary embodiments have been described with the antenna element 78 transmitting the signal for position detection, it would be understood that the antenna elements 80 of the computing device 42 may transmit a signal for position detection, and the antenna element 78 of the gas sampler device 36 may receive and process the transmitted signal to determine (or e.g. triangulate) the location of the gas sampler device 36. The location information can then be communicated to the computing device 42. Accordingly, in some exemplary embodiments reference herein to "sending" and "receiving" of signals may be reversed, as appropriate.

Exemplary formats which may be processed by wireless communication subsystems 62, 64 over the wireless communications medium 66 include Radiofrequency (RF), Radiofrequency Identification (RFID), Bluetooth®, and the like. Communications between the wireless communication subsystems 62, 64 may be further encrypted or signed to ensure integrity of the communications. Other hardware or software based protection schemes may be used to prevent physical or code-based tampering with the communication subsystems 62, 64.

In some embodiments, the location of the gas sampler device 36 may be logged by the computing device 42 when the gas sample is received.

Analysis

Referring again to FIG. 2, the computing device 42 receives the signals from the gas sampler device 36 and determines: if the readings from the gas sampler device 36 are indicative of an alcohol concentration at or in excess of a predetermined threshold; and if the readings of temperature, humidity, volume and pressure (or hum) are indicative of the gas sample being of human origin, i.e. if the gas sample should be viewed to be a breath sample.

The predetermined threshold is a matter of choice for the jurisdiction of interest, and varies with the permitted BAC in that jurisdiction and assumed partition ratios. In the United States, for example, the predetermined threshold would be set at 0.08 grams of alcohol per deciliter of blood.

In the event of a reading at or in excess of a predetermined threshold, the gas sampler device 36 disables itself for a predetermined period of time and the controller makes a suitable log entry.

Persons of ordinary skill are readily capable of manufacturing gas sampler devices of this type, and as such, details are neither required nor provided herein.

Alarm

When receiving a gas sample, if the location of the gas sampler device 36 is located outside of a specified region within the motor vehicle 22, an alarm event is triggered. For example, if an alcohol level of the received gas sample has been determined to be otherwise acceptable, the alarm event would still be triggered if the location of the gas sampler device 36 within the motor vehicle 22 is determined to be not acceptable.

The alarm event is also triggered after a gas sample has been provided which, on analysis, reveals alcohol concentration at or above the predetermined threshold.

When the vehicle is in the inoperable state or at rest, the alarm event results in the computing device 42 disabling operation of the vehicle 22 (or maintaining a disabled state if already disabled).

If the vehicle is operable and moving, the immobilizer circuit 34 may be activated to incrementally reduce flow to the fuel pump 39.

If the vehicle is operable and moving, the alarm event may result in triggering of an "alarm state" of the vehicle 22. This may not necessarily include immediately disabling operation of the vehicle 22, as this may pose a safety risk. For example, in the alarm state, the fail light 51 and tone generator 43 may be activated. The siren 38 may also be actuated. The alarm state may be deactivated on receipt of a suitable gas sample at a suitable location of the gas sampler device 36; or if the vehicle is switched into the inoperable state.

Enablement/Disablement

In some example embodiments, the computing device 42 is configured to disable the vehicle 22 in response to analysis of a gas sample received by the gas sampler device 36 and the location of the gas sampler device 36 within the vehicle 22. When the vehicle 22 is in the inoperable state or at rest, disablement occurs through appropriate actuation of the relay 44 in the starter circuit, i.e. when the key 24 is inserted and partially turned, the starter relay 44 is disabled. When the vehicle 22 is running or in operation, disablement occurs through the arming of a lock-out subroutine, specifically, the subroutine sends a signal to the immobilizer circuit 34. For example, on receipt of a gas sample by the gas sampler device 36, a signal is sent to the immobilizer circuit 34 to incrementally reduce flow to the fuel pump. This state is signaled to the operator of the vehicle 22 by illumination of warning light 46.

In some embodiments, the computing device 42 is configured to enable operation of the vehicle 22. Enablement occurs when the vehicle 22 is in receipt of a gas sample which, on analysis, is viewed to be a breath sample and which reveals alcohol concentration below the predetermined threshold and the gas sampler device 36 is found to be located within an acceptable or specified location within the vehicle 22. Enablement may include an enablement of the starter relay 44 as well as ending of any alarm state by, e.g., a darkening of any illuminated prompt 45, warning 46 and fail 51 lights, and a silencing of the tone generator 43 and siren 38.

Figure 4:
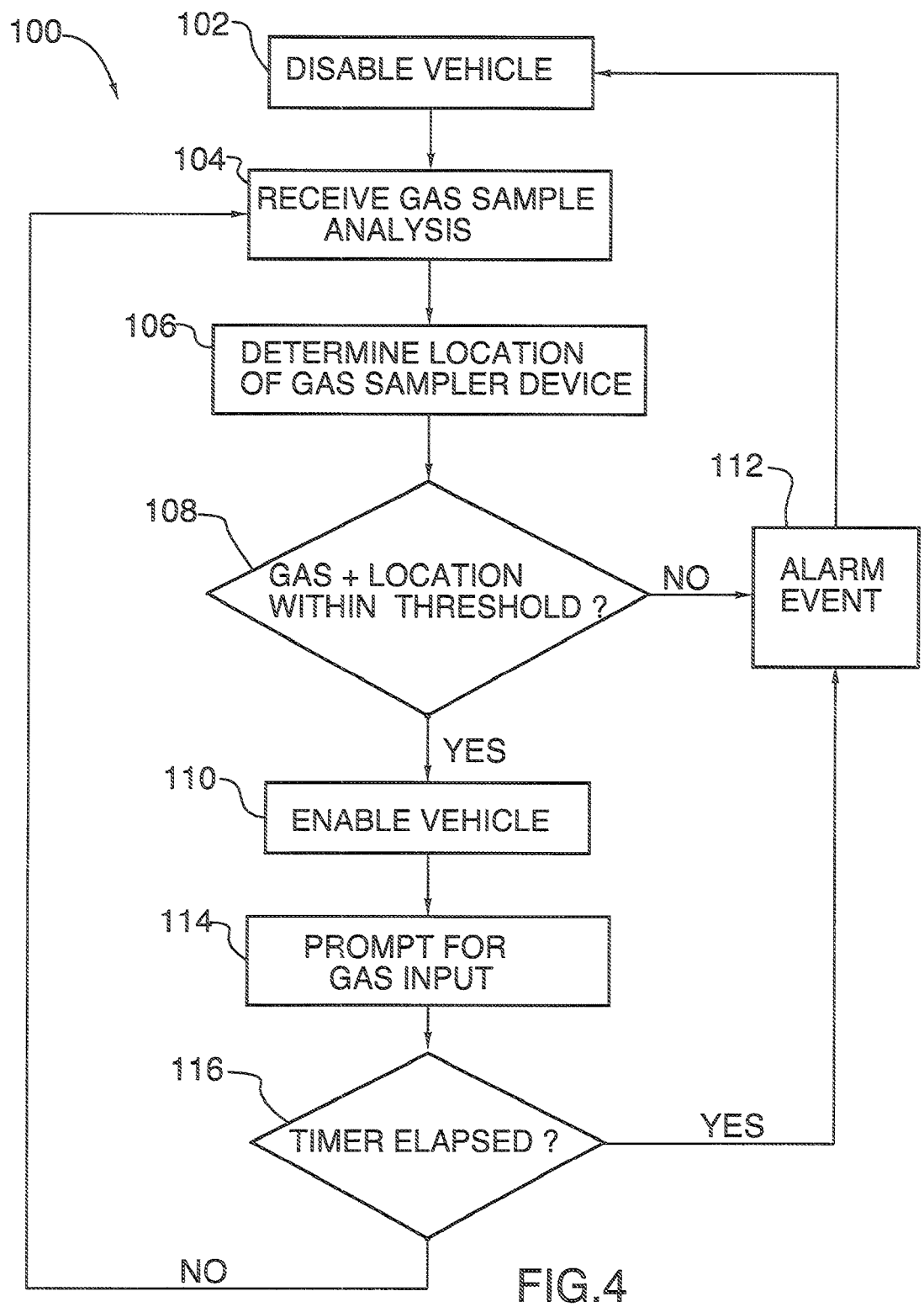
FIG. 4 illustrates a flow diagram of a method performed by an interlock in accordance with an example embodiment.

Reference is now made to FIG. 4, which illustrates a flow diagram of a method 100 performed by the computing device 42 in accordance with an exemplary embodiment. At event 102, the method begins with the computing device 42 disabling operation the vehicle 22. Disablement may include maintaining a disabled state if the vehicle 22 is already disabled. Disablement may include disabling the starter relay 44 when the vehicle 22 is at rest. Disablement may include activating the immobilizer circuit 34 when the vehicle 22 is running until the vehicle 22 stops moving and once the vehicle 22 is at rest, the starter relay 44 is disabled.

At event 104, the gas sampler device 36 receives a gas sample from the driver and sends an appropriate signal to the computing device 42. For example, the signal may be an analog or digital signal in dependence of a concentration of alcohol detected. At event 106, a location of the gas sampler device 36 within the vehicle 22 is determined. At event 108, it is determined whether the alcohol concentration is within a specified threshold and whether the location of the gas sampler device 36 is within a specified location. If both are satisfied (if "yes"), at event 110 the computing device 42 enables operation of the vehicle 22. If the vehicle 22 is already running, event 110 includes the computing device 42 maintaining enablement of the vehicle 22. If either are not satisfied (if "no"), at event 112 the computing device 42 triggers an alarm event. In some example embodiments, as part of the alarm event the method subsequently (immediately or after a delay) proceeds to event 102 to once again disable operation of the vehicle 22. In some example embodiments, at event 112 during the alarm event, an alarm state may be triggered which alarm state can include activation of the tone generator 43 and/or the prompt light 45.

At event 114, the vehicle 22 is enabled, running and in operation. At a periodic or random duration, the computing device 42 may prompt the driver to provide another gas sample. The driver may be given a specified time limit to provide the gas sample. Thus, at event 116, it is determined whether a timer has elapsed prior to receiving a suitable gas sample, for example received within a specified time period. If the timer elapses (if "yes"), the method proceeds to the alarm event of event 112, and subsequent disabling of the vehicle 22 at event 102. If the timer has not yet elapsed (if "no"), this means that a suitable gas sample has been received in time, for example returning again to event 104.

As indicated previously, it may arise that a driver may attempt to have a "sober" friend blow into the device to start or maintain operation of the vehicle. At the same time, the driver may pretend to blow into a "dummy" or fake gas sampler in order to thwart camera detection of the gas intake, while the friend hides and blows into the real gas sampler device. In some example embodiments, the gas sampler would be required to remain in clear view of the camera based on the required location of the gas sampler within the vehicle.

Whereas exemplary embodiments have been described, numerous variations are possible. In some example embodiments, an indicator is displayed to the driver to indicate when the gas sampler is within the specified location, such as a green light for acceptable and a red light for non-acceptable.

Further, whereas in the exemplary embodiments described, the device is for use with a vehicle having a mechanical key actuator, other actuation devices, such as RFID fobs and digital keypads, are contemplated.

Further, whereas in the exemplary embodiment, the alarm state activates an immobilizer circuit, it is possible for the alarm state to interfere with motion of the vehicle by interaction with other systems, such as the brake sensor or OBD-II port.

Additionally, whereas a fuel cell sensor is described, other sensors, including but not limited to infrared sensors, could be utilized.

As well, whereas in the exemplary embodiment discussed, the sensor is an analog sensor capable of providing an indication of alcohol concentration in air, the sensor could be of a binary type, and capable only of determining if the predetermined threshold had been exceeded. In this regard, in many jurisdictions, the predetermined threshold is that which is indicative of the presence of BAC in excess of 0.08 grams alcohol per deciliter of blood.

In some embodiments, the gas sampler device can be adapted merely to communicate raw data to the computing device, wherein the computing device performs the analysis to determine whether the gas sample is within an acceptable threshold.

Moreover, though the disclosure heretofore has largely focused on contexts in which alcohol consumption is of interest, it should be understood that the invention is applicable to other types of controlled substances as well, such as, for example, a narcotic drag (e.g., cocaine, heroin or marijuana). In such cases, appropriate detection equipment would be interfaced with an interlock in a vehicle or other machinery and could operate in substantially similar manner as the equipment described heretofore in connection with alcohol.

Additionally, whereas various specific types of interlock arrangements are described herein, modifications are possible. For example, whereas the exemplary embodiment utilizes a relay in the starter solenoid circuit for disablement at start-up, the relay could be disposed in the ignition circuit itself, or in any other circuit that must be triggered in order to trigger the ignition circuit. Alternatively, the immobilizer circuit could be used for disablement at start-up. As well, whereas the immobilizer circuit described is interposed in the fuel pump circuit, this is not necessary.

As well, whereas a specific motor vehicle is described, it will be emphasized that variations of the vehicle are possible without affecting the described interlock. The invention can be embodied in motor vehicles that do not have starter motors, for example, electric vehicles, and with vehicles that do not have 'ignition circuits', for example, diesel vehicles. In the case of a vehicle lacking a starter, for example, an electric vehicle, disablement (i) occurs through the issuance of suitable signals to the motor controller. In addition to automobiles, the invention can be used with, for example, buses, transport trucks, motorcycles and trains.

Further, whereas an 'aftermarket' device is arguably implied in this document, it should be understood that in this description and in the accompanying claims, the vehicle with which the interlock is used and the interlock device could be defined by a vehicle having an OEM interlock installed, with the interlock device and the balance of the vehicle being inoperable and incomplete except with one another.

As well, whereas in the exemplary embodiment, the gas sampler is adapted merely to assess through crude measurements of temperature, etc. whether the sample has been provided by a person, rather than, for example, a machine or a balloon, additional functionality could and would likely be added, for greater utility. Conventional "hum" sensors could, for example, be employed, to further ensure that the gas sample was of human origin; devices for recording attempts by the user to start the vehicle while intoxicated could be added, as is desirable in some jurisdictions; and various recorders and identification methodologies could be employed, to assist in the identification of the person providing the sample.

As well, the system can include a tachograph, and the period between prompts can be adjusted to vary on the basis thereof. For example, prompt generation may be most frequent in the first couple of hours of operation, to reflect the fact that alcohol consumed immediately prior to commencement of driving activity can take some time to consume. The tachograph can also be used to log events associated with the breath alcohol tester.

Further, whereas in the exemplary embodiments described, various enablement and disablement states are specified, it will be understood that these are functional concepts, only. Thus, whereas it is described that the vehicle is disabled automatically on receipt of a gas sample by the gas sampler device 36, it will be understood that this could be a positive disablement, i.e. sending a trigger to disable the vehicle on receipt of a gas sample or a negative disablement, i.e. sending a trigger which maintains a previously-created disabled state of the vehicle.

As vehicular applications are specifically mentioned in detail, the invention could have application in stationary devices, such as used for the purpose of house arrest.

While some of the embodiments are described in terms of methods, a person of ordinary skill in the art will understand that present embodiments are also directed to various apparatus such as a server apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present invention.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The scope of the claims should not be limited by the embodiments set forth in the examples, but should be given the broadest interpretation consistent with the description as a whole.

What is claimed is:

1. An improved interlock device for use with a vehicle and by a driver of the vehicle, the interlock device being of the type having a handpiece including a gas sampler, the handpiece being adapted to permit the driver to bring the gas sampler into the vicinity of the mouth of the driver when the driver is positioned to drive the vehicle, comprising:
    a device including a wireless communication subsystem having at least one antenna element, where the device is configured to receive and process signals to determine three dimensional location data of the gas sampler during a delivery of a breath sample to the gas sampler; and
    trigger of an alarm event associated with a failure to position the gas sampler in a predetermined zone defined by a physical space wherein the gas sampler could be situated during the delivery of the breath sample to the gas sampler by the driver when the driver is positioned to drive the vehicle.

2. An improved interlock device according to claim 1, wherein the interlock device is configured to accept the breath sample from the gas sampler only when the gas sampler is within the predetermined zone and the alarm event is associated with a failure to deliver the breath sample.

3. An improved interlock device according to claim 2, wherein the alarm event results in immobilization of the vehicle.

4. An improved interlock device according to claim 1, wherein the interlock device is configured to accept the breath sample from the gas sampler and the alarm event is associated with the delivery of the breath sample when the gas sampler is positioned outside the predetermined zone.

5. An improved interlock device according to claim 4, wherein the alarm event results in immobilization of the vehicle.

6. An improved interlock device according to claim 1, further comprising:
    a camera adapted to capture an image of the face of the driver when the driver is positioned to drive the vehicle.

7. An improved interlock device according to claim 6, wherein the camera is adapted to capture the image upon the delivery of the breath sample to the gas sampler.

8. An improved interlock device according to claim 1 wherein the device configured to determine in three dimensions utilizes triangulation.

9. An improved interlock device for use with a vehicle and by a driver of the vehicle, the interlock device being of the type having a handpiece including a gas sampler, the handpiece being adapted to permit the driver to bring the gas sampler into the vicinity of the mouth of the driver when the driver is positioned to drive the vehicle, comprising:
    a device including a wireless communication subsystem having at least one antenna element, where the device is configured to receive and process signals to determine three dimensional location data of the gas sampler during a delivery of a breath sample to the gas sampler; and
    trigger of an alarm event associated with a failure to position the gas sampler in a predetermined zone defined by a physical space wherein the gas sampler could be situated during the delivery of a breath sample to the gas sampler by the driver when the driver is positioned to drive the vehicle.

* * * * *